(12) United States Patent
Ngair

(10) Patent No.: US 8,990,932 B2
(45) Date of Patent: Mar. 24, 2015

(54) SYSTEM AND METHOD FOR PREVENTION OF MALWARE ATTACKS ON DATA

(75) Inventor: Teow Hin Ngair, Singapore (SG)

(73) Assignee: SecureAge Technology, Inc., West Chester, PA (US)

( * ) Notice: Subject to any disclaimer, the term of this patent is extended or adjusted under 35 U.S.C. 154(b) by 87 days.

(21) Appl. No.: 13/535,757

(22) Filed: Jun. 28, 2012

(65) Prior Publication Data

US 2014/0007228 A1  Jan. 2, 2014

(51) Int. Cl.
*H04L 29/06* (2006.01)
*G06F 21/56* (2013.01)

(52) U.S. Cl.
CPC ........ G06F 21/56 (2013.01); *G06F 2221/2107* (2013.01)
USPC ................ 726/22; 726/24; 713/188; 713/182

(58) Field of Classification Search
CPC ............................... H04L 63/145; G06F 21/59
USPC ............................................. 713/188; 726/22
See application file for complete search history.

(56) References Cited

U.S. PATENT DOCUMENTS

| 7,150,018 B2 * | 12/2006 | Golds et al. ................... 718/102 |
| 7,353,533 B2 * | 4/2008 | Wright et al. ..................... 726/1 |
| 7,664,924 B2 * | 2/2010 | Safa .............................. 711/163 |
| 2007/0150956 A1 * | 6/2007 | Sharma et al. .................. 726/24 |
| 2013/0091575 A1 * | 4/2013 | Duncan et al. .................. 726/24 |
| 2013/0298239 A1 * | 11/2013 | Shroff et al. .................... 726/23 |
| 2014/0259092 A1 * | 9/2014 | Boucher et al. ................... 726/1 |

* cited by examiner

*Primary Examiner* — Mohammad L Rahman
(74) *Attorney, Agent, or Firm* — North Weber & Baugh LLP

(57) ABSTRACT

The present invention relates to data encryption and more particularly to data encryption for prevention of malware attacks designed to access user data. The present invention protects user data against regular malware and advance malware like rootkit attacks, zero day attacks and anti-malware disabler attacks. In one embodiment, the present invention uses encryption, application whitelisting, and application binding to prevent malware from accessing a victim's data files. In another embodiment, the present invention uses application path binding to further contain the malware from accessing the victim's data.

18 Claims, 3 Drawing Sheets

SYSTEM AND METHOD FOR PREVENTION OF MALWARE ATTACKS ON DATA

BACKGROUND

A. Technical Field

This invention relates generally to data encryption and more particularly to data encryption for prevention of malware attacks designed to access user data.

B. Background of the Invention

There are many malware programs that attack user data and more and more malware programs are created every day. The current solutions to the malware are insufficient.

There are several different types of malware that attack user data, for example, zero day attacks, rootkit, and anti-malware disabler that cannot be prevented by existing anti-malware solutions. Attackers use existing exploits to penetrate into the organization network or create custom and targeted malware often with zero-day exploits. Attackers also establish a permanent, undetectable presence in the system and progressively inject more malware to continually access and extract new data.

Malware attackers intent is to steal sensitive data from their targeted organizations in specific sectors like the government, finance and manufacturing. The attackers use their vast resources to establish the back door that enables them to gain entry into the company network unnoticed.

The attackers are remarkably persistent in their efforts to circumvent existing defenses and stealthy tactics in order to maintain an ongoing and undetected corporate network access. They demonstrate good situational awareness by evaluating defenders' responses, relentlessly rewriting the code and then escalating their attack techniques accordingly.

One ploy often used by attackers is to lure a victim to click on a links which appear to be social networking links, but instead actually install the malicious malware onto a victim's computer. Once the malware has been installed, the attacker can gain access to the victim's data including sensitive information that can be used for identity theft or to access other sensitive data. Most of the time the victim is not even aware of the attack. In some instances the malicious malware installed even disables the victim's safeguards such as anti-virus or anti-malware software or an intrusion detection system.

In summary, what is needed is an anti-malware solution that protects a victim's data from the malware attacker such that the attacker cannot have access to the victim's sensitive information.

SUMMARY OF THE INVENTION

Embodiments of the present invention protect data by providing a file level solution. Each file can be encrypted using known encryption techniques. The encryption combined with application whitelisting provides file level protection against malware attacks. Application whitelisting creates a list of known and trusted applications. In some embodiments of the present invention, application whitelisting is combined with application binding. Application binding associates a particular type of file with a trusted application from the application whitelist.

Embodiments of the present invention provide enhanced data protection by also coupling a sandbox using the application binding. A sandbox creates an association not only between the file and the whitelisted application, but also between the file path and the whitelisted application. Thus, containing the data that can be accessed in the event of a malware attack.

Other objects and attainments together with a fuller understanding of the invention will become apparent and appreciated by referring to the following description and claims taken in conjunction with the accompanying drawings.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

The following description is set forth for purpose of explanation in order to provide an understanding of the invention. However, it is apparent that one skilled in the art will recognize that embodiments of the present invention, some of which are described below, may be incorporated into a number of different computing systems and devices. The embodiments of the present invention may be present in hardware, software or firmware. Structures shown below in the diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

One problem with existing anti-malware solutions is that they do not protect a victim's data against attacks. For example, a low level rootkit attack could access a victim's data undetected. A zero day attack could also enter without being detected by an anti-malware product. Also malware can disable anti-malware by changing the registry therefore rendering the anti-malware useless.

Figure 1:
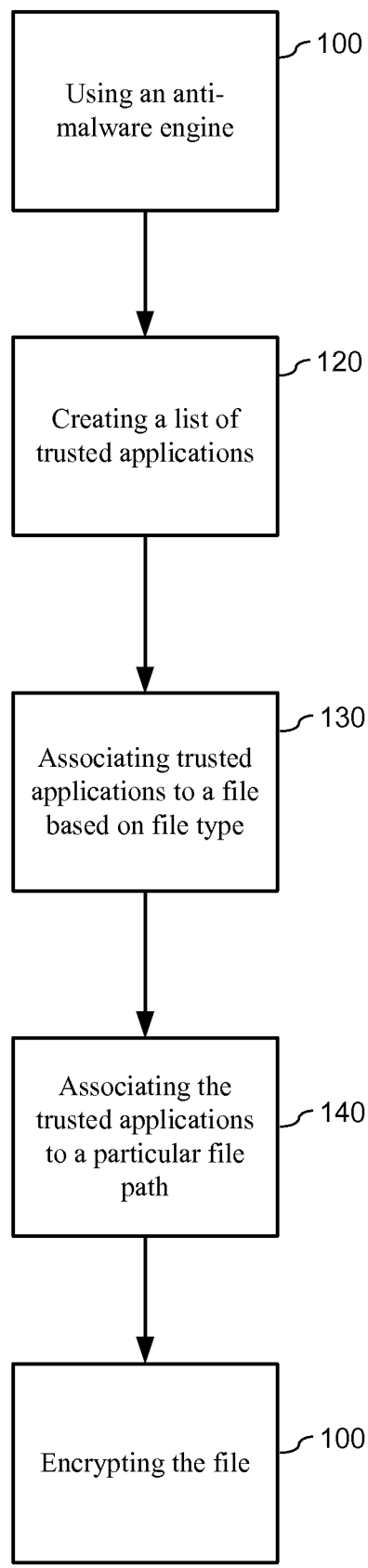
FIG. 1 shows a flowchart of a method of data protection, in accordance with various aspects of the present invention.

FIG. 1 shows a flowchart of a method of data protection, in accordance with various aspects of the present invention.

Figure shows using an anti-malware engine 100. In one embodiment, the anti-malware engine 100 can include one or more of creating a list of trusted applications 120, associating trusted applications to a file based on file type 130, and associating the trusted application to a particular file path 140.

FIG. 1 also shows creating a list of trusted applications 120. This process is also referred to as application whitelisting. Application whitelisting creates a list of trusted applications that are permitted to run. Applications not on the list, including malware, are not allowed to run.

This whitelisting does block malware from running on the victim's computer. It also prevents existing malware from infecting the machine with more malware. Application binding can be used to prevent zero-day attacks. In one embodiment, application whitelisting combined with encryption can prevent regular malware, low level rootkit and anti-malware disabler.

FIG. 1 also shows associating trusted applications to a file based on file type 130. This association is also referred to as application binding. Application binding creates an association between a file and its application. For example, all .doc and .docx files can be binded to Microsoft Word® so they can only be accessed using Microsoft Word®. Therefore, if another program is attacked, for example, Adobe Reader is compromised by a malware attack, the malware will not be able to access any Microsoft Word® documents.

FIG. 1 also shows associating the trusted application to a particular file path 140. This association is also referred to as a sandbox. In sandbox creation, not only is the particular application and file binded, but the file and the file path are binded to the whitelisted application. Thus, the malware is further constrained because the compromised application can only read and write data to a specific directory and cannot harm, or access, the underlying system in general. For example, Microsoft Internet Explorer® could be constrained to the directory C:\IE\* so that is the only directory accessible by Microsoft Internet Explorer®.

FIG. 1 also shows encrypting a file 110. In an embodiment of the present invention, each file on the victim's computer system can be encrypted individually. Thus, providing some protecting against malware attacks. For example, even if the anti-malware is disabled, the decryption would also be disabled so the attacker would not gain access to the data.

In one embodiment a proactive, pervasive, and persistent encryption engine can be employed. The proactive feature uses smart and automatic encryption of all data files without the user's involvement. The pervasive feature means that all data files are encrypted in all storage devices. The persistent feature means that all data files are encrypted at rest and on the move.

Figure 2:
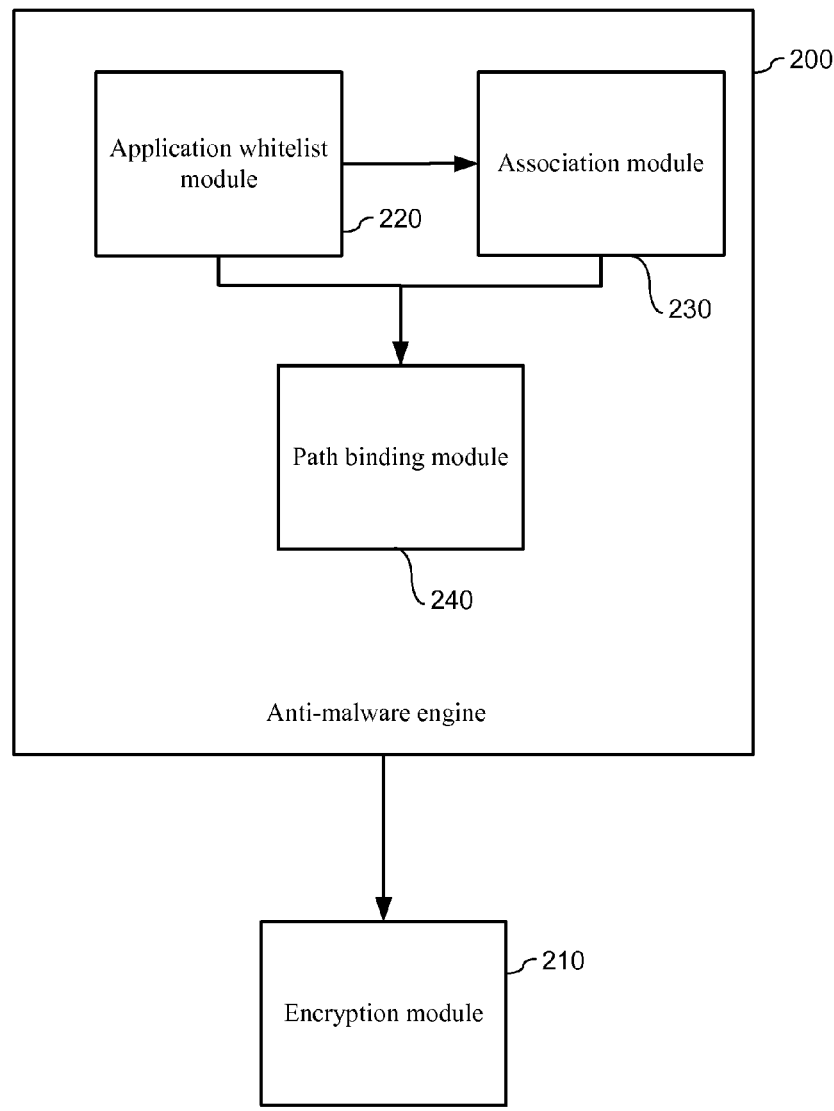
FIG. 2 shows a block diagram of a system of data protection, in accordance with various aspects of the present invention.

FIG. 2 shows a block diagram of a system of data protection, in accordance with various aspects of the present invention. FIG. 2 shows anti-malware engine 200 that operates within a computing system (not shown). In one embodiment, computing system is a single hard drive. In another embodiment, computing system is a network of hard drives. In another embodiment, computing system is a cloud storage system. In another embodiment, computing system is all storage space accessible by a particular computer or network.

Computing system includes an anti-malware engine 200 and an encryption module 210. Anti-malware engine 200 includes an application whitelist module 220, an association module 230, and a path binding module 240. In one embodiment the encryption module 210 employs a proactive, pervasive, and persistent encryption engine. The proactive feature uses smart and automatic encryption of all data files without the user's involvement. The pervasive feature means that all data files are encrypted in all storage devices. The feature component means that all data files are encrypted at rest and on the move. The encryption that can be used by the encryption module is more fully described above with reference to FIG. 1.

In one embodiment the application whitelist module 230 contains a list of trusted applications. Only the trusted applications on the list are permitted to run. All others, including malware, are prevented from running.

In one embodiment the association module 230 binds a file to an application based on file type. Therefore, files of a certain type are only permitted to be accessed by a particular application. Thus, constraining the ability of malware to obtain data from these file types in the event of a malware attack.

In one embodiment the path binding module 240 binds an application to a particular file path or directory. Again, acting to contain malware access in the event of an attack so that the malware will only be able to access data in a particular directory. Thus, protecting data files in other directories.

In one embodiment, the encryption module 210 and the application whitelist module 220 are implemented in a single driver. In another embodiment, the encryption module 210 and the application whitelist module 220 are implemented in different drivers. The association module 230 and the path binding module 240 can also be implemented in the same driver as the encryption module 210 and the application whitelist module 220 or can be implemented in different drivers. Implementing the modules in different drivers allows the flexibility to turn on or off the modules independent of each other. In certain circumstances it may be desirable to only run some of the modules. In other circumstances it may desirable to run all of the modules simultaneously.

Regardless of the driver implementation, in one embodiment, the encryption module 210 and the application whitelist module 220 are tightly coupled. Those two modules 210 and 220 work closely together to provide maximum protection against rootkit attacks and anti-malware disabler attacks. In one embodiment, the association module 230 and the path binding module 240 are tightly coupled.

Figure 3:
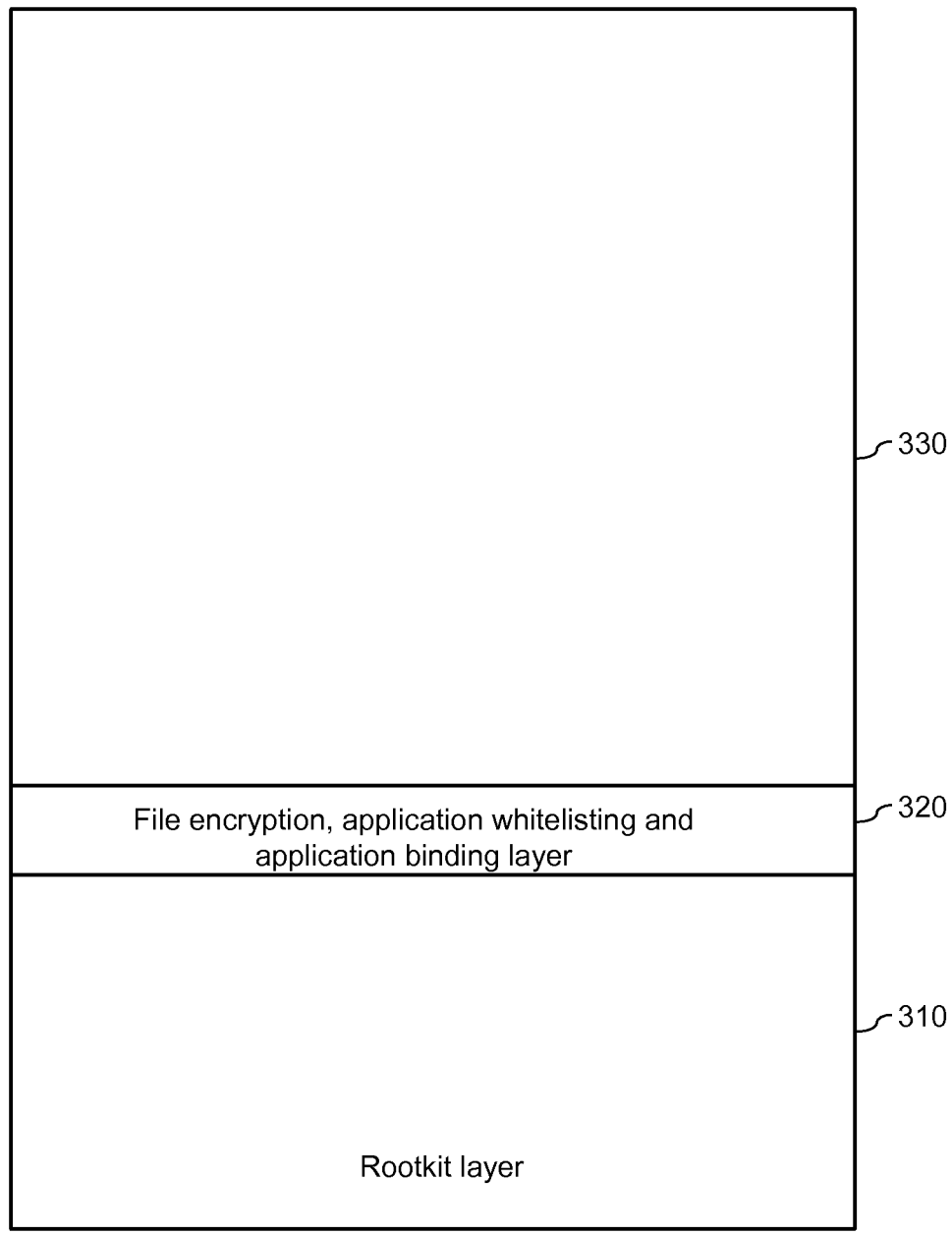
FIG. 3 shows a block diagram of layers of computing in a computer system, in accordance with various aspects of the present invention.

FIG. 3 shows a block diagram of layers of computing in a computer system, in accordance with various aspects of the present invention. FIG. 3 shows the encryption, application binding and application whitelisting layer 320. That layer is where the present invention operates. Rootkit attacks are low level attacks, sometimes even below the level of the operating system. Rootkit attacks take place a level below the encryption, application binding and application binding layer 320 in the rootkit layer 310. If the malware accesses data at a very low level without passing through the encryption, application whitelisting, and application binding layer 320, the data will appear as encrypted to the malware.

In order for the malware to access the data it would have to be above the encryption, application whitelisting, and application binding layer 320. However, once above the encryption, application whitelisting, and application binding layer 320, the application whitelisting will prevent the malware from running, and the application binding will restrict the type of files that can be accessed. Therefore the embodiments of the present invention successfully prevent malware (both regular malware and low level rootkit) attacks from accessing the victim's data.

Very low level rootkit can avoid detection by application whitelisting because it can access a victim's data without having the data pass through the whitelisting engine. However, with encryption coupled with application whitelisting, even if the attacker accesses the victim's data, it will be encrypted. Therefore, the sensitive data is protected by the encryption.

With the combination of encryption at the file level and application whitelisting, two different types of malware can be prevented from accessing a victim's data, rootkit and anti-malware disabler.

Malware that disabled the application whitelisting and/or application binding will also disable the encryption engine because in one embodiment they are tightly coupled. So once application whitelisting is disabled, the decryption will also be disabled. Therefore, the attacker can only access encrypted data. Again, the sensitive data is protected from malware attacks.

It will be apparent to one of ordinary skill in the art that the present invention can be implemented as a software application. It will be apparent to one of ordinary skill in the art that the present invention can be implemented as firmware in an field programmable gate array (FPGA) or as all or part of an application specific integrated circuit (ASIC) such that software is not required. It will also be apparent to one of ordinary skill in the art that computer readable media includes not only physical media such as compact disc read only memory (CD-ROMs), SIM cards or memory sticks but also electronically distributed media such as downloads or streams via the internet, wireless or wired local area networks or interfaces such as Ethernet, HDMI, USB, Bluetooth or Zigbee, etc., or mobile phone system.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications, combinations, permutations, and variations as may fall within the spirit and scope of the appended claims.

I claim:

1. A method for protecting data from malware attack, comprising:
   encrypting a file with an encryption engine;
   creating a list of trusted applications using an anti-malware engine permitting only trusted applications to execute, the anti-malware engine coupled to the encryption engine such that in the event the anti-malware engine is inactive, the encryption engine is also inactive preventing the file from being decrypted with the encryption engine.

2. The method of claim 1, wherein the anti-malware engine comprises associating a trusted application to the file based on file type.

3. The method of claim 1, wherein the anti-malware engine comprises associating a trusted application to a particular file path.

4. The method of claim 1, wherein the encrypting the file and the associating the trusted applications is implemented using the same driver.

5. The method of claim 1, wherein the encrypting the file and the associating the trusted applications is implemented using different drivers.

6. The method of claim 1, wherein the method of protecting data is used on an end user computer system.

7. The method of claim 1, wherein the method of protecting data is used on a cloud computing system.

8. The method of claim 1, wherein the method of protecting data is used in a corporate network setting.

9. A system of protecting data from malware attack, comprising:
   an encryption module for encrypting a data file stored in a memory;
   an anti-malware engine implemented on a processor comprising an application whitelist module for creating a list of trusted applications and only allowing trusted applications to execute, the anti-malware module coupled to the encryption module such that in the event the anti-malware engine is inactive, the encryption module is also inactive, for protecting data during a malware attack by preventing the file from being decrypted with the encryption module.

10. The system of claim 9, wherein the anti-malware engine comprises an association module for associating a trusted application to the file based on file type.

11. The system of claim 9, wherein the anti-malware module comprises a path binding module for associating the trusted applications to a particular file path.

12. The system of claim 9, wherein the encryption module and the association module are implemented using the same driver.

13. The system of claim 9, wherein the encryption module and the association module are implemented using different drivers.

14. The system of claim 9, wherein the system of protecting data is used on an end user computer system.

15. The system of claim 9, wherein the system of protecting data is used on a cloud computing system.

16. The system of claim 9, wherein the system of protecting data is used in a corporate network setting.

17. Non-transitory computer readable media for protecting data from malware attack, comprising computer readable code recorded thereon for:
   encrypting a file using an encryption engine;
   creating a list of trusted applications using an anti-malware engine, coupled to the encryption engine such that in the event the anti-malware engine is inactive, the encryption engine is also inactive preventing the file from being decrypted with the encryption engine;
   permitting only trusted applications to execute; and
   associating trusted applications to the file based on file type.

18. The non-transitory computer readable media of claim 17, further comprising computer code recorded thereon for associating the trusted applications to a particular file path.

* * * * *